T. GARE.
MANUFACTURE OF SHEET INDIA RUBBER AND THE COATING OR FACING OF FABRICS AND THE LIKE WITH INDIA RUBBER.
APPLICATION FILED FEB. 6, 1909.
986,162.
Patented Mar. 7, 1911.
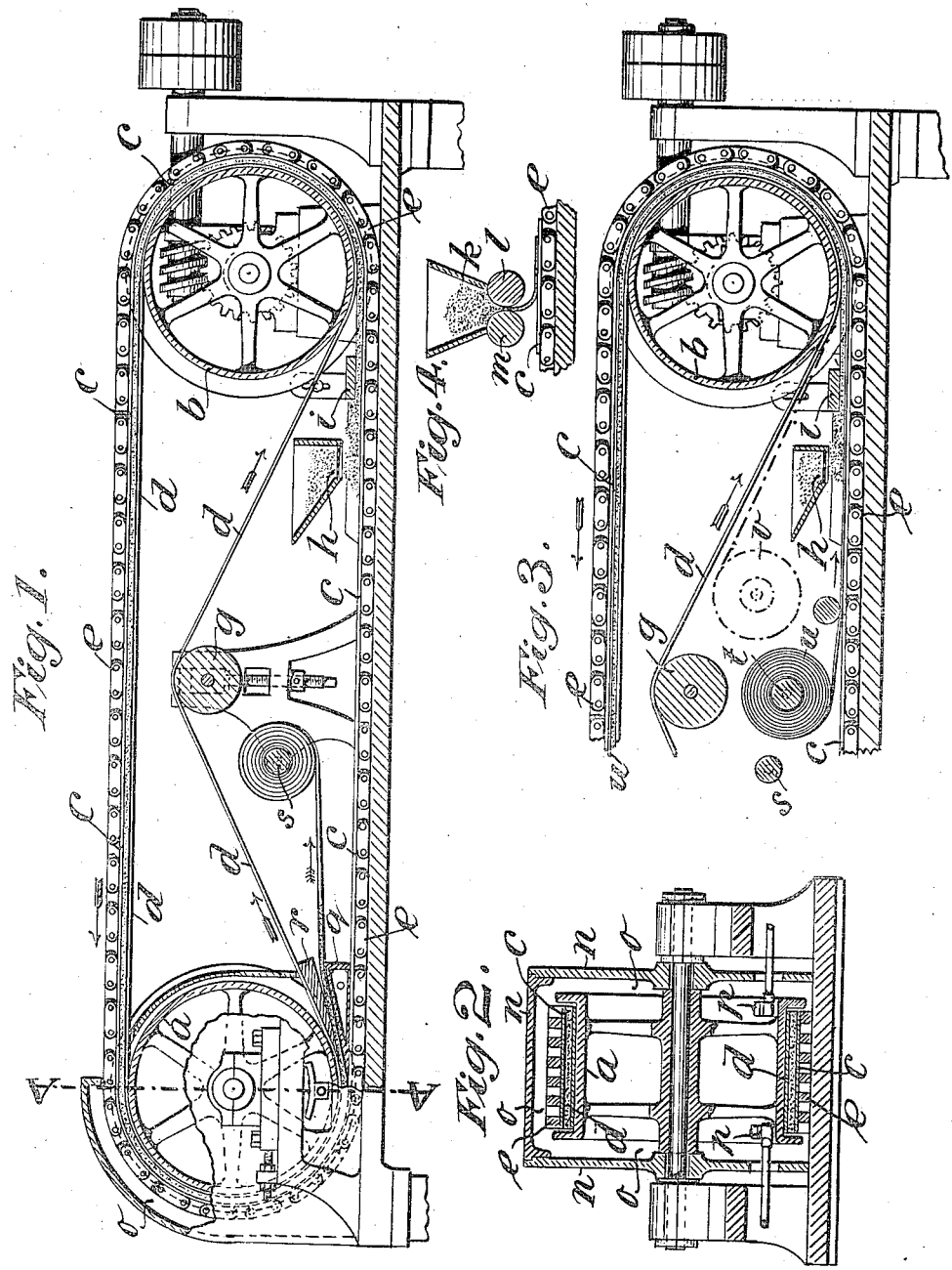

UNITED STATES PATENT OFFICE.

THOMAS GARE, OF NEW BRIGHTON, ENGLAND.

MANUFACTURE OF SHEET INDIA-RUBBER AND THE COATING OR FACING OF FABRICS AND THE LIKE WITH INDIA-RUBBER.

986,162.

Specification of Letters Patent.  Patented Mar. 7, 1911.

Application filed February 6, 1909. Serial No. 476,561.

*To all whom it may concern:*

Be it known that I, THOMAS GARE, subject of Great Britain, residing at New Brighton, in the county of Chester, Kingdom of Great Britain, have invented new and useful Improvements in and Connected with the Manufacture of Sheet India-Rubber and the Coating or Facing of Fabrics and the Like with India-Rubber, of which the following is a specification.

The object of my invention is to provide a machine whereby sheet india rubber can be manufactured from powdered vulcanized india rubber or fabric or the like coated or faced with india rubber applied in powder form in one continuous operation, which machine forms a further development of the process for the manufacture of india rubber goods described in my application for Letters Patent Serial No. 332,103, filed Aug. 27th, 1906. In my improved machine for manufacturing sheet india rubber and for coating or facing fabric or the like with india rubber powdered vulcanized rubber is subjected between two traveling endless surfaces to the pressure of a rotary surface to press and free it from air and then by the said traveling surfaces under pressure subjected to the heat of another rotary surface which reforms the rubber. I attain these objects by the mechanism illustrated in the accompanying drawing, in which —

Figure 1 is a sectional side elevation, and Fig. 2 a cross section on line A—A of Fig. 1, and Fig. 3 a detached sectional side elevation of a machine constructed in accordance with one embodiment of my invention. Fig. 4 is a sectional end view of a modified form of rubber feeding device.

Similar letters refer to similar parts throughout the several views.

Referring to Figs. 1, 2 and 3, the machine used for carrying out my improved process for manufacturing sheet india rubber may consist of two flanged rotary drums $a$, $b$ and two endless flexible bands $c$, $d$, say of metal or fabric placed one inside the other around the said drums between which the rubber is fed, the drum $a$ being adapted to be heated to the desired temperature by steam or other suitable means. In order to retain the outer band $c$ in its proper position relative to the inner band $d$ a metal link, woven wire or the like heavy belt $e$ is placed over and assists the band $c$ in giving the amount of pressure required and prevents it from bulging out. Between the said two bands I employ a guide roller or pulley $g$ (or pulleys) over which the inner band $d$ runs so as to provide room for the feeding of the rubber and fabric in case of facing or coating and to deliver the rubber sheet produced. The rubber feeding device used may be a riddle $h$ and a vertically adjustable gage $i$ in front thereof. The drum $a$ to be heated is partly inclosed in a casing $n$ the outer half of which is larger than the inner half and forms a chamber $o$ around the respective part of the bands $c$, $d$ and drum $a$ adapted to receive heat say from Bunsen burners $p$ projecting up each side into the casing whereby both the interior of the drum and also the bands $c$, $d$ are heated. As the said drums and bands rotate, the rubber is carried by the said bands first around the drum $b$ not heated, which presses the rubber to the desired degree of density and at the same time frees it from air, then confined under pressure and excluded from air, to and around the heated drum and chamber which heats it to the temperature necessary for the reformation of the rubber and finally through or over a cooling device employed adjacent to the said drum.

From Fig. 1 of the drawing will be readily seen, that owing to the semi-circular shape of the heating chamber $o$, the india rubber between the two bands $c$, $d$ will not be subjected to heat until the bands begin to run around the drum $a$, that is to say, when the rubber is under complete compression which is an essential feature in the reforming of the rubber and also that the moment the compression ceases, that is to say, the bands leave the drum $a$ the rubber is freed from heat. The cooling device may consist as in the present instance, see Fig. 1, of a box $q$ through which water circulates, or of a water tank, cold rollers, spray pipes or any other convenient means as will be readily understood without illustration. If deemed necessary a blade $r$ may be employed against the inner band $d$, see Fig. 1, to insure the delivery of the rubber sheet produced. Adjacent to the heated drum $a$ and said cooling device, I employ in suitable bearings a shaft or roller $s$ suitably rotated, upon which the sheet rubber produced is wound. In order to permit of varying the tension of the said bands and thereby the degree of density to which it is desired to press the powdered india rubber, I may render one or both of the said drums, preferably the heated drum *a* only horizontally adjustable.

When coating or facing fabrics with rubber applied in powder form I mount in suitable bearings adjacent to the drum *b* a shaft *t*, see Fig. 3, adapted to receive a roll of fabric *u* which is fed upon the outer band *c* and upon which latter the powdered rubber is spread. When producing rubber sheeting from powdered vulcanized rubber faced or covered with fabric on both sides a second roll of fabric *v* is fed in between the two bands *c, d* and the powdered rubber spread between the said two pieces of fabric, as shown in dotted lines, Fig. 3. The heat I use may vary from ordinary vulcanization temperature to 420 degrees Fahrenheit or more and the speed of the drums may be varied in accordance with the thickness of the rubber sheet, coat or face to be applied to the fabric. The rubber sheet to be produced from powdered vulcanized rubber may have a design impressed on one or both sides by suitably furnishing or forming the said bands or the periphery of the drum or drums with the desired design. Instead of using powdered vulcanized rubber only such may be mixed with an adulterant or any other suitable material.

I claim:

1. In a machine for manufacturing sheet india rubber from powdered vulcanized rubber and coating fabrics with india rubber used in powder form, two rotary drums, means for heating one of the said drums, two traveling endless pressure bands arranged one inside the other and carried by the said drums and means for feeding the powdered rubber between the said bands, all substantially as and for the purpose set forth.

2. In a machine for manufacturing sheet india rubber from powdered vulcanized rubber and coating fabrics with india rubber used in powder form, two rotary drums, means for heating one of the said drums, comprising a casing forming a semi-circular chamber around the latter, two traveling endless pressure bands arranged one inside the other and carried by the said drums and means for feeding the powdered rubber between the said bands, all combined substantially as and for the purpose set forth.

3. In a machine for manufacturing sheet india rubber from powdered vulcanized rubber and coating fabrics with india rubber used in powder form, two rotary drums, means for heating one of the said drums, two traveling endless pressure bands arranged one inside the other and carried by the said drums and a guide pulley mounted near the top of the said bands between the said drums over which the inner of the said bands runs from one drum to the other, all substantially as and for the purpose set forth.

4. In a machine for manufacturing sheet india rubber from powdered vulcanized rubber and coating fabrics with india rubber, used in powder form, two rotary drums, means for heating one of the said drums, two endless pressure bands arranged one inside the other and carried by the said drums and means for feeding between the said bands a fabric to be coated with rubber used in powder form, all substantially as and for the purpose set forth.

5. In a machine for manufacturing sheet india rubber from powdered vulcanized rubber and coating fabrics with india rubber used in powder form, two rotary drums, means for heating one of the said drums, two traveling endless pressure bands arranged one inside the other and carried by the said drums, means for feeding the powdered rubber between the said bands and a third heavy band running in contact with the outer of the said two bands, all combined substantially as and for the purpose set forth.

In testimony whereof I have signed my name to this specification in the presence of two subscribing witnesses.

THOMAS GARE.

Witnesses:
STANLEY E. BRAMALL,
ALFRED BONHARDT.